(12) United States Patent
Edmonson (10) Patent No.: US 7,980,809 B1
(45) Date of Patent: Jul. 19, 2011

(54) VEHICLE TRANSPORT APPARATUS

(76) Inventor: Tommy L. Edmonson, Choctaw, OK (US)

( * ) Notice: Subject to any disclaimer, the term of this patent is extended or adjusted under 35 U.S.C. 154(b) by 0 days.

(21) Appl. No.: 12/484,808

(22) Filed: Jun. 15, 2009

Related U.S. Application Data (62) Division of application No. 11/193,055, filed on Jul. 29, 2005, now Pat. No. 7,547,179.

(51) Int. Cl.
*B60P 3/12* (2006.01)

(52) U.S. Cl. ........ 414/812; 414/475; 414/563; 280/402; 280/408

(58) Field of Classification Search .............. 414/471, 414/474, 475, 481, 483, 563, 812; 280/402, 280/407.1, 408
See application file for complete search history.

(56) References Cited

U.S. PATENT DOCUMENTS

| | | |
|---|---|---|
| 3,837,673 A | 9/1974 | McCarthy |
| 3,987,919 A | 10/1976 | Weeks et al. |
| 4,132,326 A | 1/1979 | Pinto |
| 4,317,579 A | 3/1982 | Louw |
| 4,348,054 A | 9/1982 | Shonkwiler et al. |
| 4,493,491 A | 1/1985 | Karlik |
| 4,569,531 A | 2/1986 | Beadle |
| 4,650,205 A | 3/1987 | Jarlsson |
| 4,943,202 A | 7/1990 | Galloway |
| 5,013,056 A | 5/1991 | Landoll et al. |
| 5,667,231 A | 9/1997 | Dierks et al. |
| 5,863,059 A | 1/1999 | Waggoner |
| 6,036,207 A | 3/2000 | Oehlerking et al. |
| 6,287,061 B1 | 9/2001 | Tinnell |
| 6,786,158 B2 | 9/2004 | Jacob |
| 6,857,376 B2 | 2/2005 | Coslovi et al. |
| 6,886,362 B2 | 5/2005 | Wilding et al. |
| 6,893,205 B2 | 5/2005 | Heim et al. |
| 6,901,728 B2 | 6/2005 | Keiderman |
| 6,902,368 B2 | 6/2005 | Hagenzieker |
| 7,547,179 B1 * | 6/2009 | Edmonson .................. 414/563 |
| 2007/0020073 A1 | 1/2007 | Chaddock |

* cited by examiner

*Primary Examiner* — James Keenan
(74) *Attorney, Agent, or Firm* — Fellers, Snider, et al.; Daniel P. Dooley

(57) ABSTRACT

Methods of making and using a vehicle transport apparatus are provided. An exemplary method of making the vehicle transport apparatus includes at least the steps of providing a beam with a kingpin attached on each a proximal and distal end, linking a single and only axle in vertical and horizontal sliding support of the beam, wherein the beam adjusts vertically relative to the axle, and the axle adjusts horizontally relative to the beam, and wherein the beam is unsupported by the single and only axle during at least one operating mode of the beam, attaching a guide post to the axle, securing a vertical slide member to the beam and in sliding contact with the guide post, and interposing a vertical position control apparatus between the vertical slide member and the axle, the vertical position control apparatus controlling the vertical position of the beam relative to the axle.

8 Claims, 10 Drawing Sheets

VEHICLE TRANSPORT APPARATUS

RELATED APPLICATIONS

This application is a divisional of U.S. patent application Ser. No. 11/193,055 filed Jul. 29, 2005, now U.S. Pat. No. 7,547,179, entitled "Vehicle Transport Apparatus."

FIELD OF THE INVENTION

The claimed invention relates to the field of vehicle transport equipment; more particularly, but not by way of limitation, to a vehicle transport apparatus for transporting long haul semi tractors.

BACKGROUND

Transporting semi tractors from a manufacturer's inventory to various dealer and customer destinations is typically a tedious process that frequently includes the mounting of two rigs onto a third. That is, a first semi tractor is "piggy backed" onto a second semi tractor and a third semi tractor is "piggy backed" onto the first semi tractor. In this configuration, the second semi tractor is used to pull all three to the delivery destination, or destinations.

Using the prior art "piggy back" technique, the mounting time of the semi tractors typically takes substantially eight man hours of time, and the dismounting of the semi tractors take an additional eight man hours of time. In addition to the sixteen man hours of mounting and dismounting time, a driver of the trio of "piggy backed" semi tractors typically needs to arrange for return transportation, which most often is a one way airline ticket. With two days of driving and one day on return flights, the man hours for transport of the trio of semi tractors could take forty hours of time plus the cost of an airline ticket.

As such, challenges remain and a need persists for improvements in methods and apparatuses for use in the delivery of semi tractors.

SUMMARY OF THE INVENTION

In accordance with exemplary embodiments, methods of making and using a vehicle transport apparatus are provided. An exemplary method of making the vehicle transport apparatus includes, but is not limited to, at least the steps of providing a beam with a kingpin attached on each a proximal and distal end, linking a single and only axle in vertical and horizontal sliding support of the beam, wherein the beam adjusts vertically relative to the axle, and the axle adjusts horizontally relative to the beam, and wherein the beam is unsupported by the single and only axle during at least one operating mode of the beam, attaching a guide post to the axle, securing a vertical slide member to the beam and in sliding contact with the guide post, and interposing a vertical position control apparatus between the vertical slide member and the axle, the vertical position control apparatus controlling the vertical position of the beam relative to the axle.

An exemplary method of using the vehicle transport apparatus includes, but is not limited to, at least the steps of collapsing a rear air suspension of a first vehicle, lashing a rear axle of the first vehicle to a frame of the first vehicle, coupling a first kingpin of a vehicle transport apparatus to a fifth wheel of the first vehicle, restraining the first vehicle adjacent to frame members of the vehicle transport apparatus, loading a return vehicle onto the frame members of the vehicle transport apparatus, coupling a second kingpin of the vehicle transport apparatus to a fifth wheel of a second vehicle. In the exemplary embodiment, the second vehicle is coupled to the second kingpin of the vehicle transport apparatus by steps that include, but are not limited to placing a tow tongue of the vehicle transport apparatus into a vehicle transport position, moving an axle of the vehicle transport apparatus from adjacent a distal end of the vehicle transport apparatus to a position adjacent a proximal end of the vehicle transport apparatus, raising the frame members of the vehicle transport apparatus using a hydraulic lift of the axle to position the second kingpin of the vehicle transport apparatus into alignment with the fifth wheel of the second vehicle, and lockingly engaging the second kingpin within the kingpin confinement portion of the fifth wheel of the second vehicle.

Further in the exemplary embodiment the return vehicle is loaded onto the frame members of the vehicle transport apparatus by steps that include, but are not limited to lowering a proximal end of the vehicle transport apparatus into contact with a surface supporting the vehicle transport apparatus, dropping a tow tongue of the vehicle transport apparatus adjacent the surface supporting the vehicle transport apparatus, disposing a load ramp of the vehicle transport apparatus into contact with the surface supporting the vehicle transport apparatus, engaging the load ramp to position the return vehicle atop the frame members of the vehicle transport apparatus, and positioning the return vehicle adjacent the first kingpin of the vehicle transport apparatus.

These and various other features and advantages that characterize the claimed invention will be apparent upon reading the following detailed description and upon review of the associated drawings.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
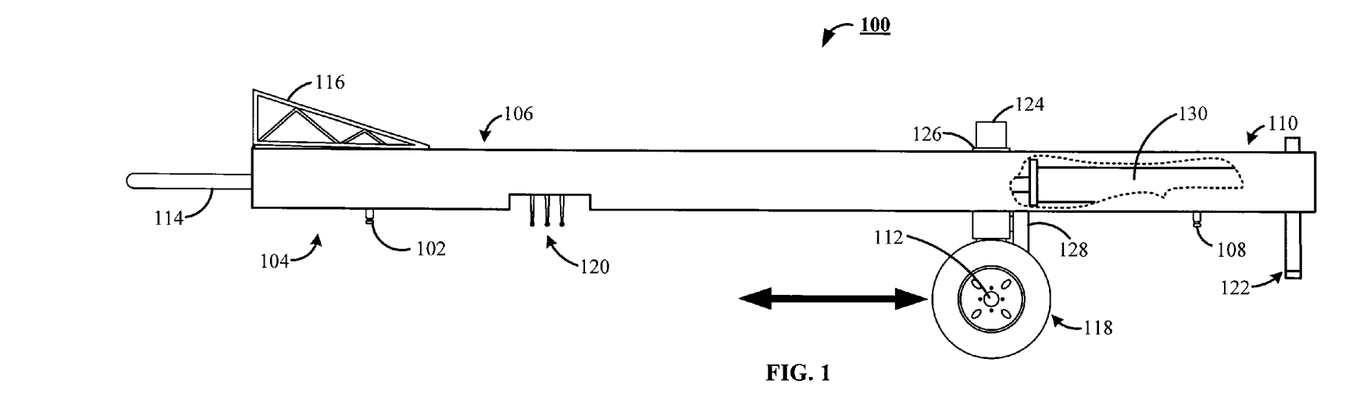
FIG. 1 is a side elevational view of an inventive vehicle transport apparatus of the present invention.

Referring to the drawings, FIGS. 1-6 are best viewed in concert to enhance an understanding of an exemplary embodiment of the present inventive vehicle transport apparatus ("VTA") 100. For example, FIG. 1 shows the VTA 100 includes: a first kingpin 102 supported on a proximal end 104 of a beam 106; a second kingpin 108 supported on a distal end 110 of the beam 106; an axle 112; a tow tongue 114; a load ramp 116; a wheel 118 supporting the axle 112; hydraulic controls 120; and detachable bumper 122.

In an exemplary embodiment, the axle 112 supports a guide post 124 confined by a vertical slide member 126. The vertical slide member 126 is secured to the beam 106, and in sliding contact with the guide post 124, and maintains the guide post 124 at a substantially 90° orientation relative to the beam 106. In the exemplary embodiment, a vertical position control apparatus 128 (which in an exemplary embodiment is a first hydraulic cylinder 128), is secured to, and supported by, the axle 112 on a first or ram end, and secured to the vertical slide member 126 on a second or cylinder end.

Figure 2:
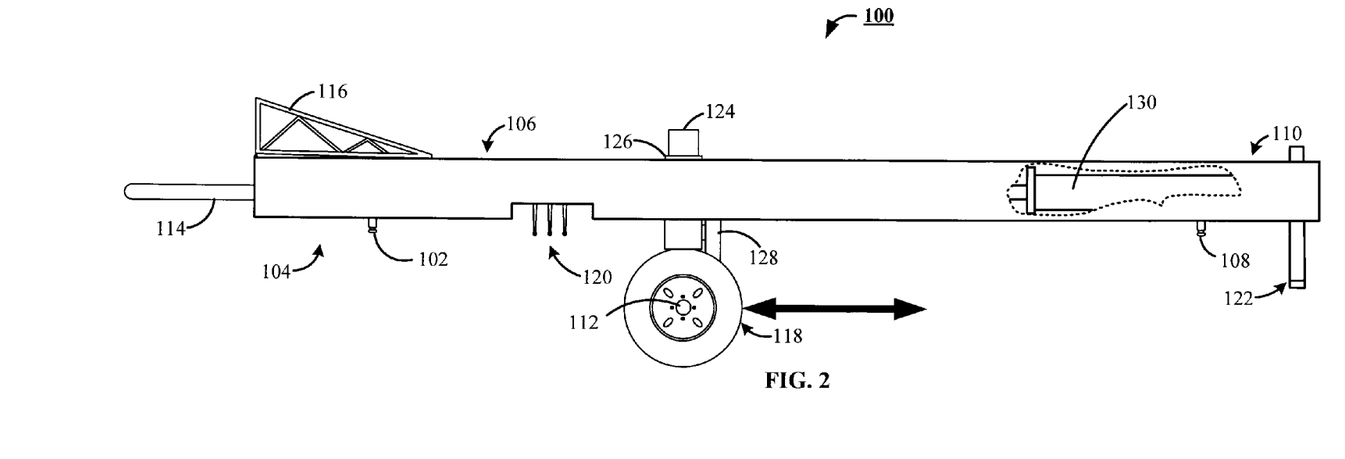
FIG. 2 is a first alternate side elevational view of the inventive vehicle transport apparatus of FIG. 1.

The partial cutaway portion shown on the distal end 110 of the beam 106 reveals a horizontal position control apparatus 130, (which in an exemplary embodiment is a second hydraulic cylinder 130). The second hydraulic cylinder 130, includes a cylinder end secured to the beam 106, and a ram end secured to a horizontal slide member 134 (of FIG. 7). In the exemplary embodiment, as shown by FIGS. 1 and 2, a selected first one of the hydraulic controls 120 activates the second hydraulic cylinder 130 to selectively position the axle 112 at any position, within the extent of the ram of the second hydraulic cylinder 130, along a horizontal continuum relative to the beam 106. In an exemplary embodiment, as shown by FIGS. 3 and 4, a selected second one of the hydraulic controls 120 activates the first hydraulic cylinder 128 to selectively position the beam 106 at any position, within the extent of the ram of the first hydraulic cylinder 128, along a horizontal continuum relative to the beam 106.

Figure 3:
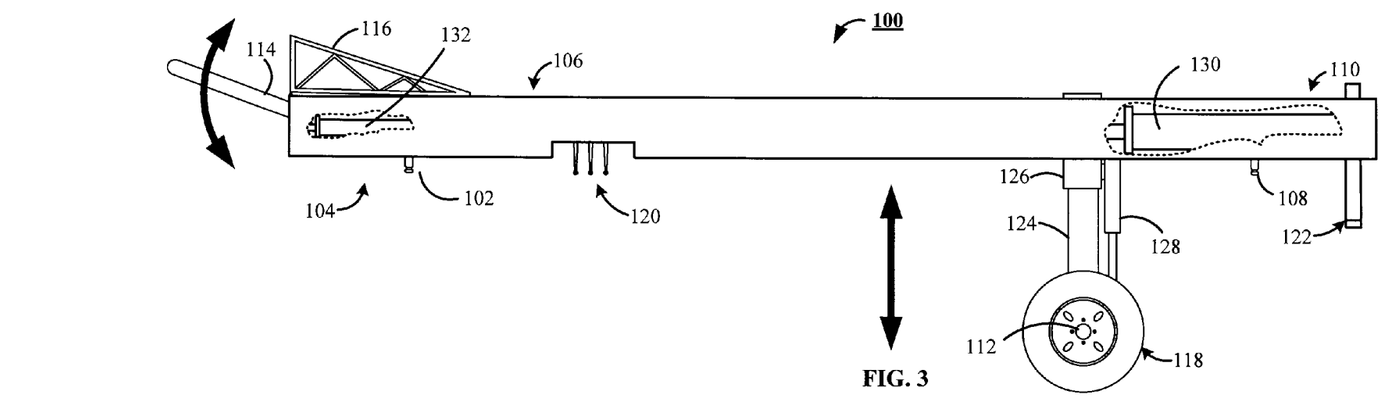
FIG. 3 is a second alternate side elevational view of the inventive vehicle transport apparatus of FIG. 1.
Figure 4:
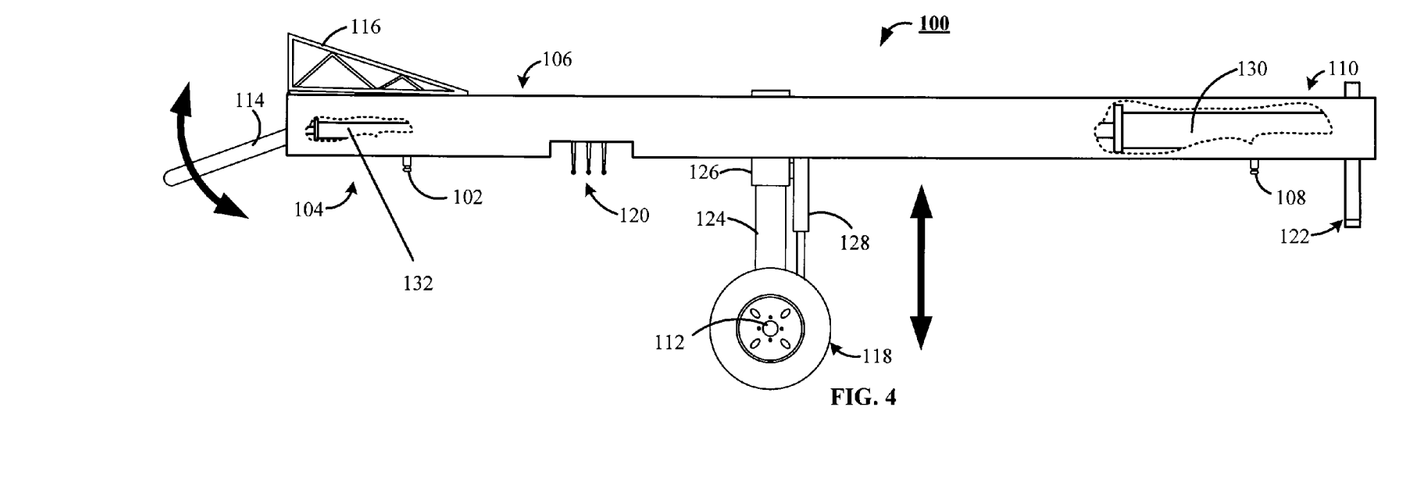
FIG. 4 is a third alternate side elevational view of the inventive vehicle transport apparatus of FIG. 1.

The exemplary embodiment of FIGS. 3 and 4 show that the VTA 100 further includes a tongue position control apparatus 132 (which in the exemplary embodiment is a third hydraulic cylinder 132). The third hydraulic cylinder 132 is located adjacent the proximal end 104 of the beam 106, and supported by the beam 106. A cylinder end of the third hydraulic cylinder 132 is secured to the beam 106, while the ram end of the third hydraulic cylinder 132 is attached to the tow tongue 114. In an exemplary embodiment, a selected third one of the hydraulic controls 120 activates the third hydraulic cylinder 132 to selectively rotate the tow tongue 114 along any position of an arc, within the extent of the ram of the third hydraulic cylinder 132, relative to the beam 106. An ability to position the tow tongue 114 enhances the utility of the VTA 100 by allowing the VTA 100 to be attached and detached from, i.e., a pickup truck, without having to manually deal with the mass of the VTA 100.

Figure 5:
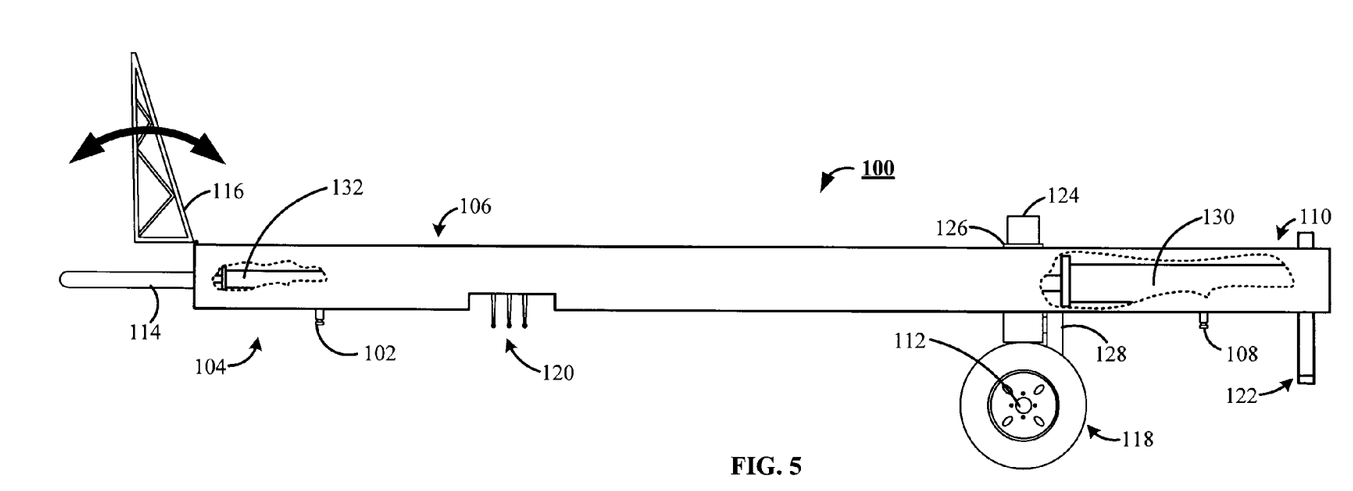
FIG. 5 is a fourth alternate side elevational view of the inventive vehicle transport apparatus of FIG. 1.
Figure 6:
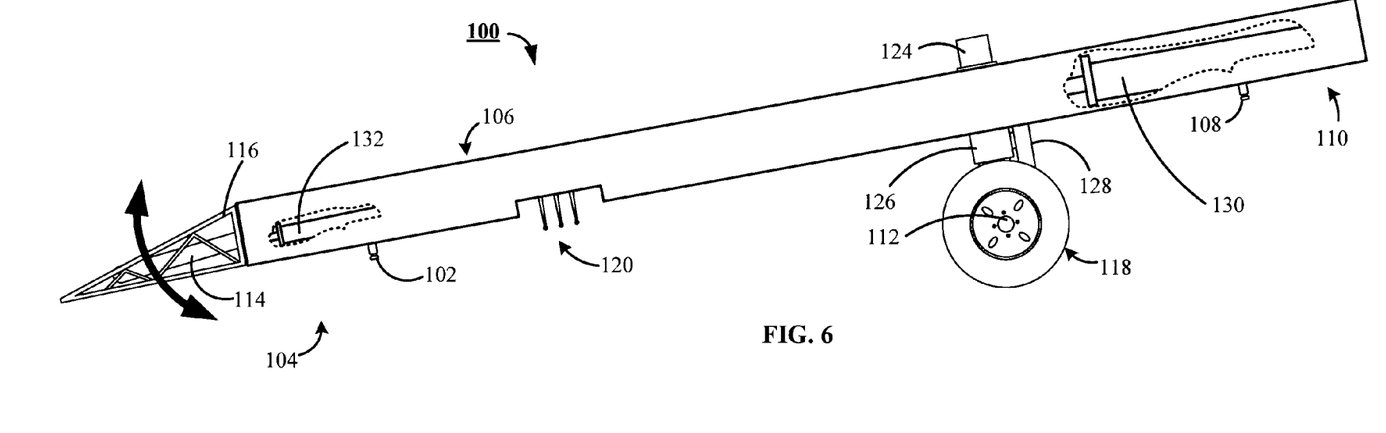
FIG. 6 is a fifth alternate side elevational view of the inventive vehicle transport apparatus of FIG. 1.

FIGS. 3 and 4 further shows the partial range of motion that the tow tongue 114 operates within, while FIGS. 5 and 6 show the substantial range of motion that the load ramp 116 operates within. In an exemplary embodiment, the VTA 100 is positioned substantially as shown by FIG. 6 for loading, or unloading a vehicle, such as a pickup truck or van, onto, or off of the VTA 100. That is, the axle 112 is positioned adjacent the distal end 110 of the beam 106, the beam 106 is positioned as near the axle 112 as the vertical slide member 126 permits, the tow tongue 114 is positioned adjacent the surface supporting the VTA 100, and pickup truck or van, and the load ramp 116 is positioned in its lowered position, i.e., adjacent the surface supporting the VTA 100 and pickup truck, or van.

In preparation and for attaching the VTA 100 to a long haul tractor (such as long haul tractor 170 of FIG. 8), it will be noted that FIG. 6 depicts the removal of the detachable bumper 122 from the VTA 100. If the detachable bumper 122 is not removed prior to attaching the VTA 100 to the long haul trailer 170, and interference would be encountered between the detachable bumper 122 and the long haul tractor 170.

Figures 7, 7A:
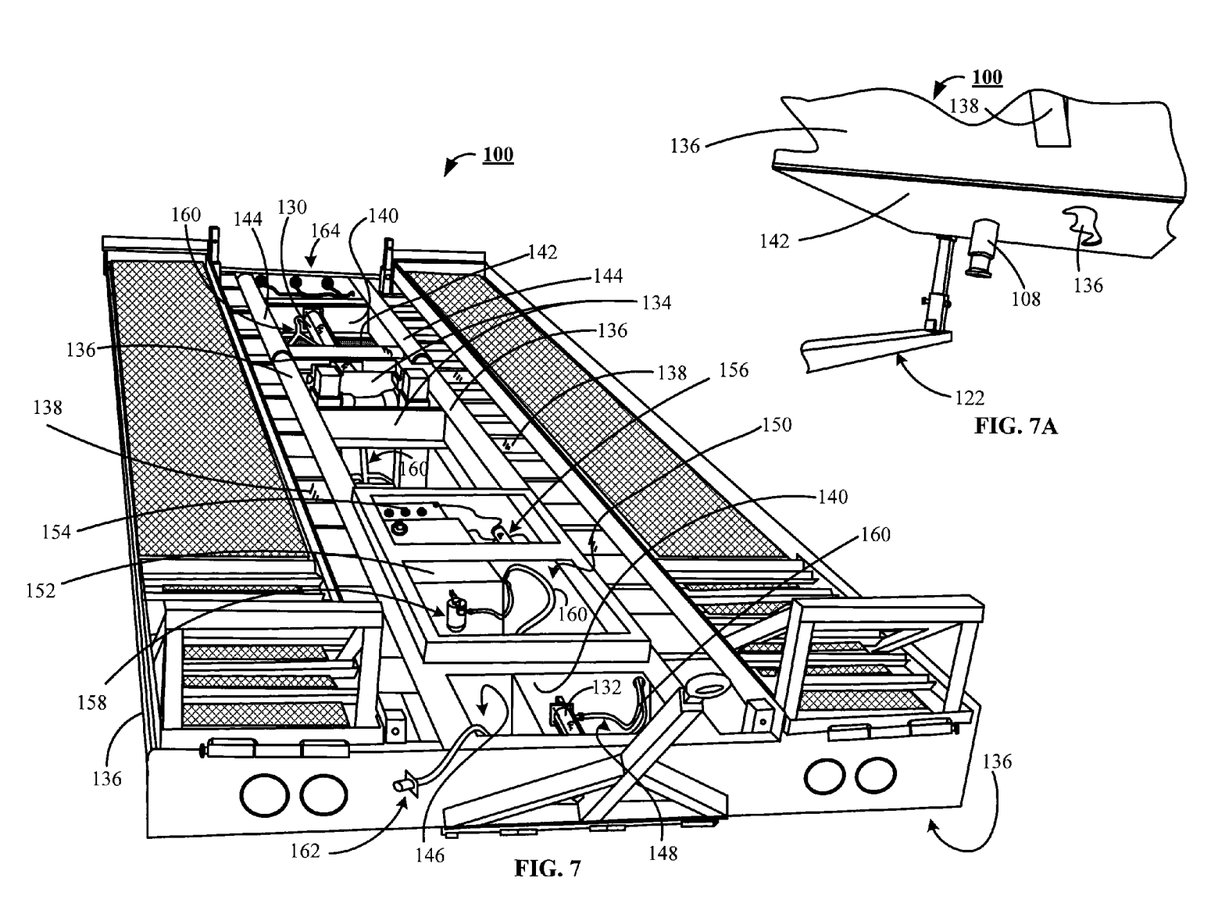
FIG. 7 is top plan perspective view of the inventive vehicle transport apparatus of FIG. 1.
FIG. 7A is a partial cut away bottom plan perspective view of the inventive vehicle transport apparatus of FIG. 7.

The exemplary embodiment of FIG. 7 shows the beam 106 includes a plurality of vehicle support members 136 extending between the proximal end 104, and the distal end 110 of the beam 106. The horizontal slide member 134 is positioned in sliding contact between two of the plurality of vehicle support members 136, which support the horizontal slide member 134. A horizontal slide member 134 is attached to the axle 112 through securement of the horizontal slide member 134 to the vertical slide member 126 (for example by welding the horizontal slide member 134 to the vertical slide member 126), and the interaction of the guide post 124 and the vertical slide member 126.

Figures 8, 9:
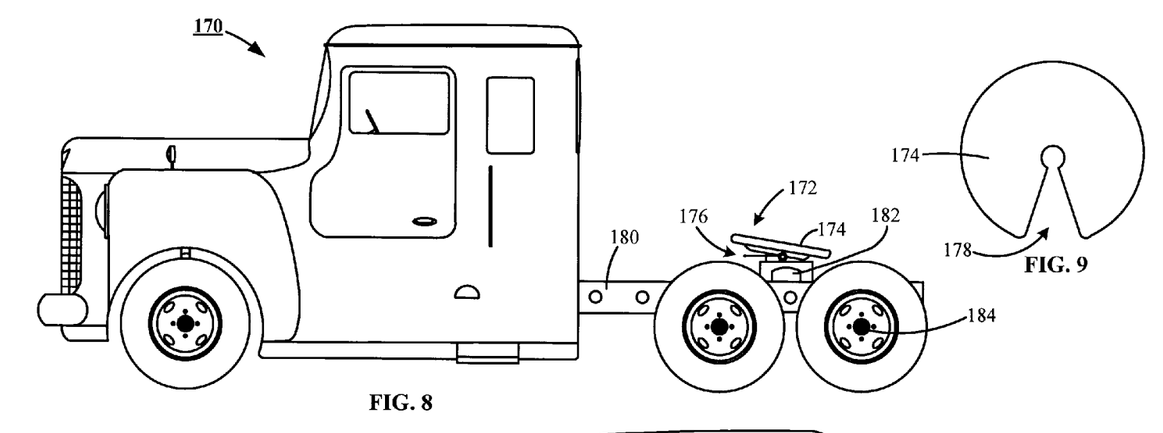
FIG. 8 is a side elevational view of a semi tractor that the inventive vehicle transport apparatus of FIG. 1 has been found useful for transport of the semi tractor.
FIG. 9 is a plan view of a fifth wheel of the semi tractor of FIG. 8.

Each of the vehicle support members 136 are interconnected, one to the other, by a plurality of cross members 138, and a plurality of stationary across beams 140. A pair of respective kingpin support members 142 (one shown) interconnect the two of the plurality of vehicle support members 136 supporting the horizontal slide member 134. The pair of respective kingpin support members 142, and their respective kingpins are configured to interface with a fifth wheel of a long haul tractor, such as shown by FIG. 8.

FIG. 7 further shows, a pair of chain support members 144, which in an exemplary embodiment are each secured to a top surface of the two of the plurality of vehicle support members 136 supporting the horizontal slide member 134, at the distal end 110 of the beam 106. In an exemplary embodiment, each of the pair of chain support members 144 provide a smooth surface for use in tightening a chain used to lash a frame of the long haul tractor (of FIG. 8), to the beam 106 of the VTA 100.

In an exemplary embodiment, the plurality of vehicle support members 136, the plurality of cross members 138, the plurality of stationary across beams 140, and the pair of support members 142 are formed from cold rolled steel. The tow tongue 114 and the load ramps 116 are respectfully formed from tubular steel members and steel angle iron, while the guide post 124 is formed from cold rolled steel, and the vertical slide member 126, and the pair of chain support members 144 are formed from tubular steel members.

The VTA 100 further provides the utility compartment 146 (used for storing log chains tools and other accessories), a tow tongue cylinder confinement chamber 148 (used for housing the third hydraulic cylinder 132), and a hydraulic fluid chamber 150. The hydraulic fluid chamber 150 is used for storing a hydraulic fluid reservoir 152 (which stores hydraulic fluid used in operating the first, second, and third hydraulic cylinders, 128, 130, and 132 respectively), a power source, such as vehicle battery 154, and an electric hydraulic pump 156.

Activation of a selected one of the hydraulic controls 120 causes current to flow from the vehicle battery 154 to power the hydraulic pump 156, which activates the hydraulic cylinder associated with the selected one of the hydraulic controls 120. It will be noted that in an exemplary embodiment, a hydraulic fluid filter 158 is interposed between the hydraulic fluid reservoir 152 and the hydraulic pump 156. A plurality of hydraulic hoses 160 are used to transfer hydraulic fluid throughout the hydraulic system (not shown separately), that is from the hydraulic fluid reservoir 152 through the hydraulic pump 156 to the plurality of hydraulic cylinders and the back to the hydraulic fluid reservoir 152. In an exemplary embodiment, a vehicle utility plug 162 is provided by the VTA 100 for use as an electrical connection to a vehicle towing the VTA 100. With the utility plug 162 plugged into the vehicle towing the VTA 100, the vehicle battery 154 is recharged by the electrical system of the vehicle towing the VTA 100, and running lights 164 are operative.

Turning to FIG. 8, shown therein is a long haul tractor 170 that includes a fifth wheel mechanism 172, used for attaching transport trailers to the long haul tractor 170. In an exemplary embodiment, the fifth wheel mechanism 172 includes a fifth wheel plate 174, and a kingpin latching mechanism 176. As shown by FIG. 9, the fifth wheel plate 174 provides a kingpin confinement portion 178.

Upon encountering kingpin 108 of the VTA 100 (of FIG. 6), the kingpin confinement portion 178 guides the kingpin 108 of the VTA 100 into interlocking engagement with the kingpin latching mechanism 176. In a locked position, the fifth wheel mechanism 172 lies in a plane substantially parallel to a plane defined by a frame member 180 of the long haul tractor 170.

FIG. 8 further shows an air reservoir 182, which serves as an air reservoir for a pressurized air suspension system (not separately shown), of the long haul tractor 170. The long haul tractor 170 depicted by FIG. 8, shows a typical profile of the long haul tractor 170 with the air suspension system activated. In contrast to the typical profile of the long haul tractor 170, with its suspension system activated, FIG. 10 depicts a profile of the long haul tractor 170 with a pressurized air bled from the air suspension system of the long haul tractor 170.

Figure 10:
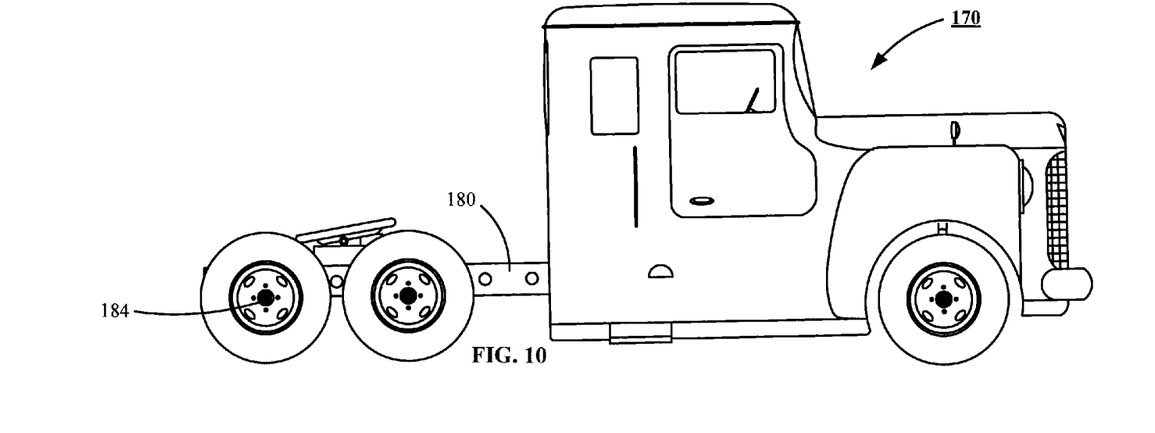
FIG. 10 is an alternate side elevational view of the semi tractor of FIG. 8 showing a relationship between a frame and axle of the semi tractor of FIG. 8 following depletion of air from the rear air suspension of the semi tractor of FIG. 8.

By comparing the profiles of the long haul tractor 170 shown by FIGS. 8 and 10, it will be noted that the distance between an axle 184 and the frame 180 of the long haul tractor 170 is substantially greater when the air suspension system is activated, i.e., filled with pressurized air, versus when the pressurized air has been bled from the air suspension system. To allow the frame 180 to come within close proximity of the axle 184, a pressure relief valve (not shown separately), of the air reservoir 182 (of FIG. 8) is opened, and the pressurized air within the air reservoir 182 (and within the air suspension system) is allowed to escape into the environment. With the pressurized air depleted from the air suspension system the frame 180 is allowed to settle into a position in close proximity to the axle 184.

In an exemplary embodiment, once the frame 180 is allowed to settle as close as possible to the axle 184, log chains are wrapped around the frame 180 and the axle 184 to maintain the position of the axle 184 relative to the frame 180.

Figure 11:
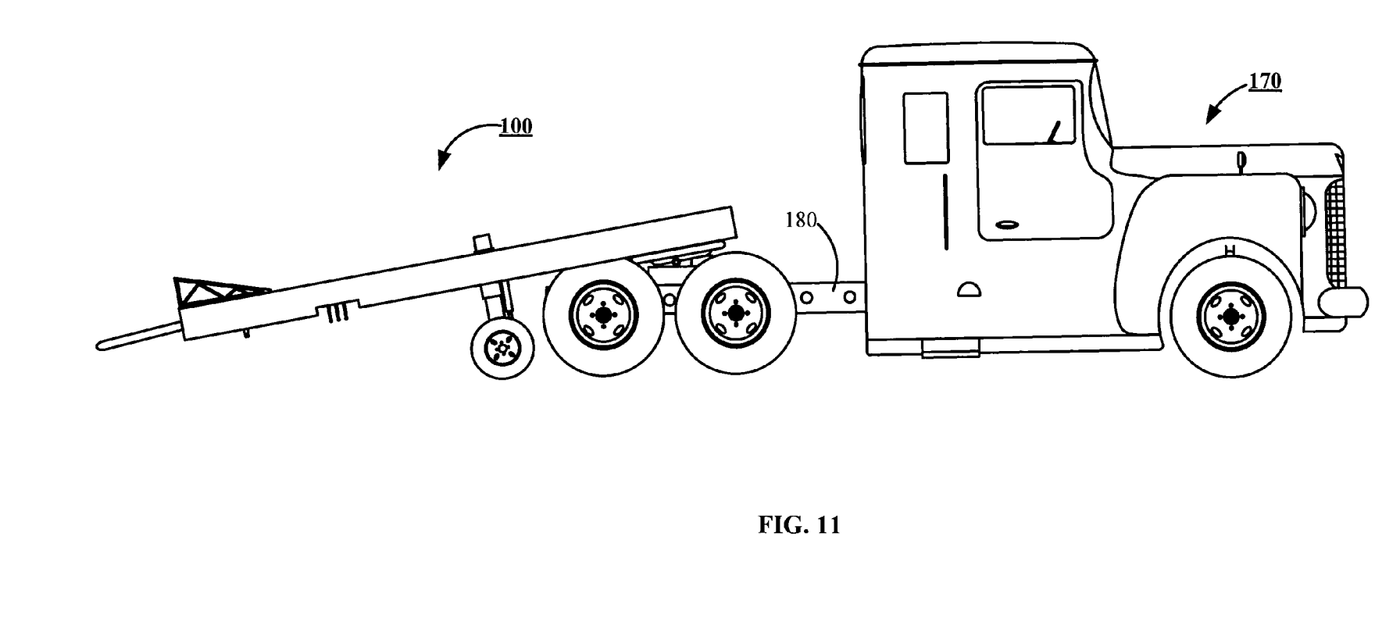
FIG. 11 is a side elevational view of the inventive vehicle transport apparatus of FIG. 1 coupled to the semi tractor of FIG. 10.

FIG. 11 shows the VTA 100 attached to the long haul tractor 170. In an exemplary embodiment, following depletion of the air from the air suspension system and air reservoir 182 of the long haul tractor 170 (of FIG. 8), the VTA 100 is positioned in alignment with the long haul tractor 170, and the kingpin 108 (of FIG. 6), is placed in interlocking engagement with the kingpin latching mechanism 176 (of FIG. 8). By example, with the kingpin 108 in locking engagement with the kingpin latching mechanism 176, first ends of log chains are lowered adjacent a first side of each chain support member 144 (of FIG. 7), wrapped around the frame 180 of the long haul tractor 170, fed back up adjacent a second side of each of the chain support members 144, and secured to second ends of the log chains. By tightening the log chains the long haul tractor 170 becomes secured to the VTA 100, and ready for transport.

Figure 12:
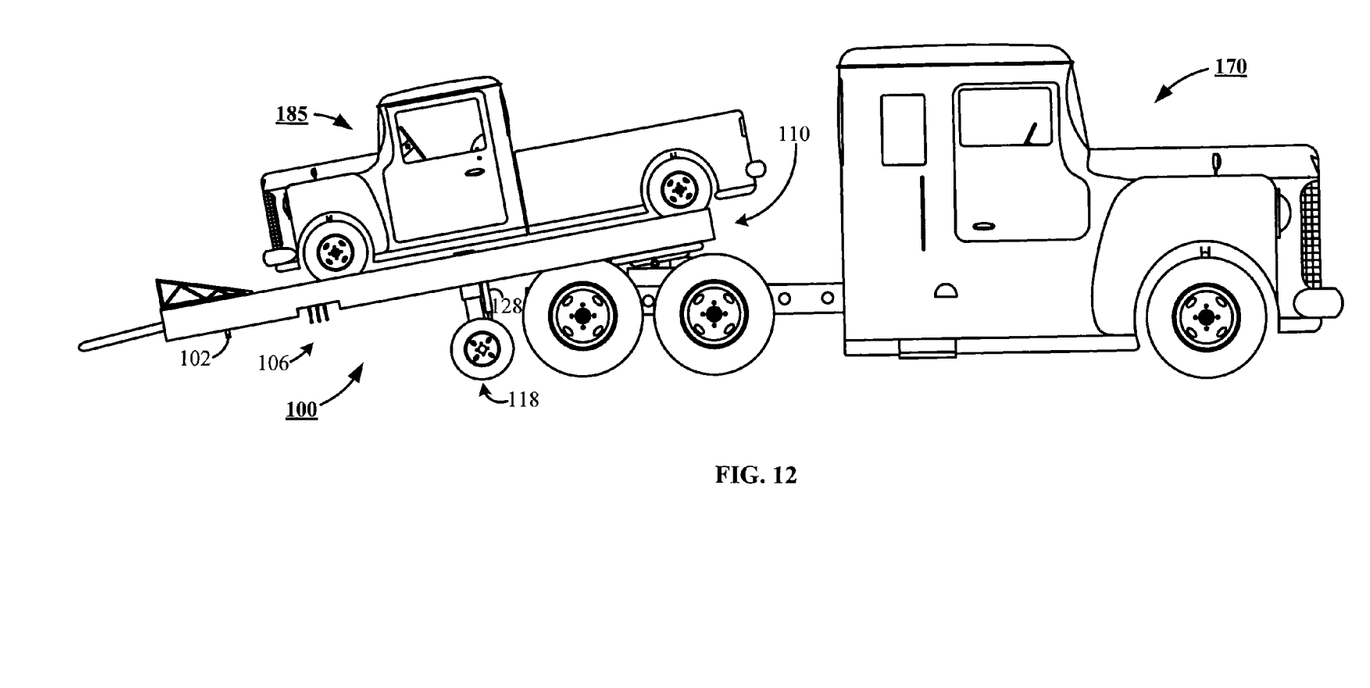
FIG. 12 is a side elevational view of the inventive vehicle transport apparatus of FIG. 1 coupled to the semi tractor of FIG. 10, and a return vehicle positioned atop the inventive vehicle transport apparatus of FIG. 1.

In an exemplary embodiment, with the VTA 100 coupled to the long haul tractor 170, the load ramps 116 of the VTA 100 are positioned to accommodate loading up a return vehicle, such as a pickup truck 185 onto the VTA 100, as shown by FIG. 12. It will be noted that prior to attaching the VTA 100 to a second long haul tractor 186 (of FIG. 13), the pickup truck 185 is positioned adjacent the distal end 110 of the VTA 100. With the pickup truck 185 positioned adjacent the distal end 110 of the VTA 100, the wheel 118 of the VTA 100 is relocated to a position substantially beneath the front tire of the pickup truck 185.

Figure 13:
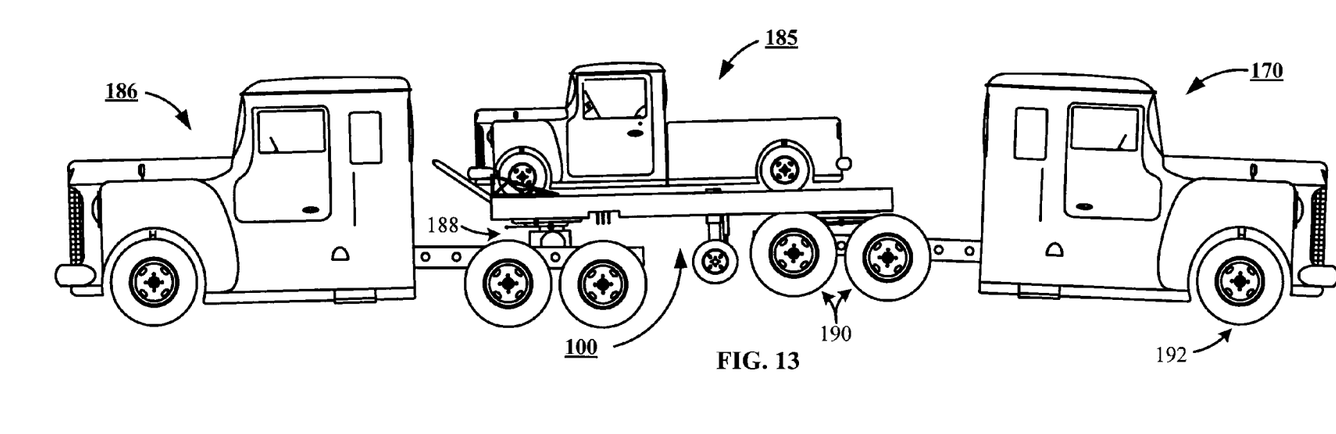
FIG. 13 is a side elevational view of the inventive vehicle transport apparatus of FIG. 1 coupled to: the semi tractor of FIG. 10; the semi tractor of FIG. 8: and with the return vehicle of FIG. 13 positioned atop the inventive vehicle transport apparatus of FIG. 1.

The repositioning of the wheel 118 results in raising the beam 106 relative to the surface supporting the VTA 100 and the long haul tractor 170. By activating the first hydraulic cylinder 128, the beam 106 is elevated to position the kingpin 102 for engagement with the second long haul tractor 186.

FIG. 13 shows the second long haul tractor 186 attached to the VTA 100. It will be noted that in preparation for delivery of the long haul tractors 170, 186, the pickup truck 185 is repositioned such that the engine and transmission of the pickup truck 185 is substantially inline over a fifth wheel 188 of the second long haul tractor 186. It should also be noted that with the fifth wheel 188 of the second long haul tractor 186 positioned for transport, the rear wheels 190 of the first long haul tractor 170 are raised off the surface supporting the second long haul tractor 186 and the front wheels 192 of the first long haul tractor 170.

Figure 14:
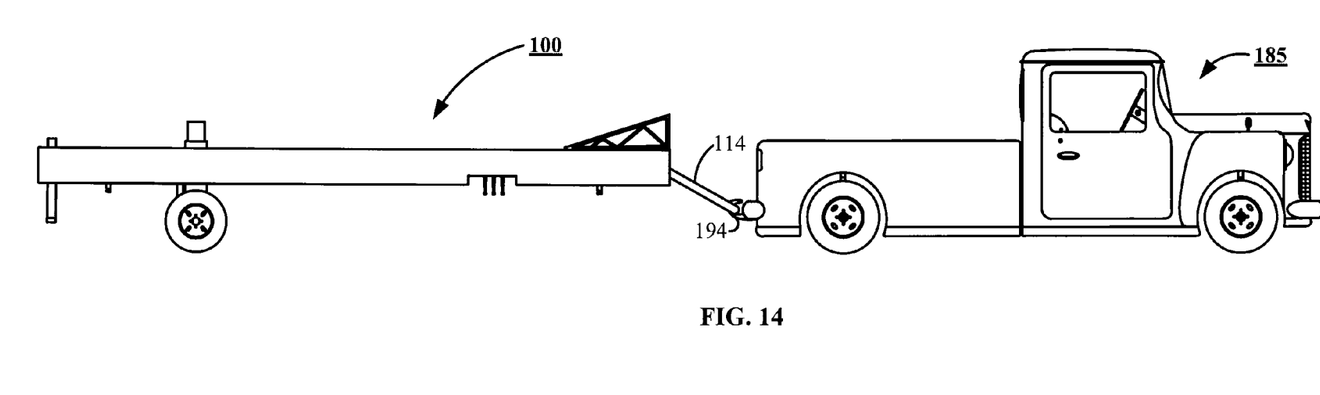
FIG. 14 is a side elevational view of the inventive vehicle transport apparatus of FIG. 1 coupled to the return vehicle of FIG. 13.

As shown by FIG. 14, following delivery of the long haul tractors 170, 186, the tow tongue 114 of the VTA 100 is attached to trailer hitch 194 of the pickup truck 185. By transporting the pickup truck 185 to the delivery point of the long haul tractors 170, 186, advantages of the VTA 100 are realized. The first advantage is that the pickup truck 185 provides the means for returning the VTA 100 to its point of departure. The second advantage is that, the delivery driver of the long haul tractors 170, 186 is provided transportation back to the point of departure, which negates the need to purchase airline tickets for the return of the delivery driver of the long haul tractors 170, 186.

Figure 15:
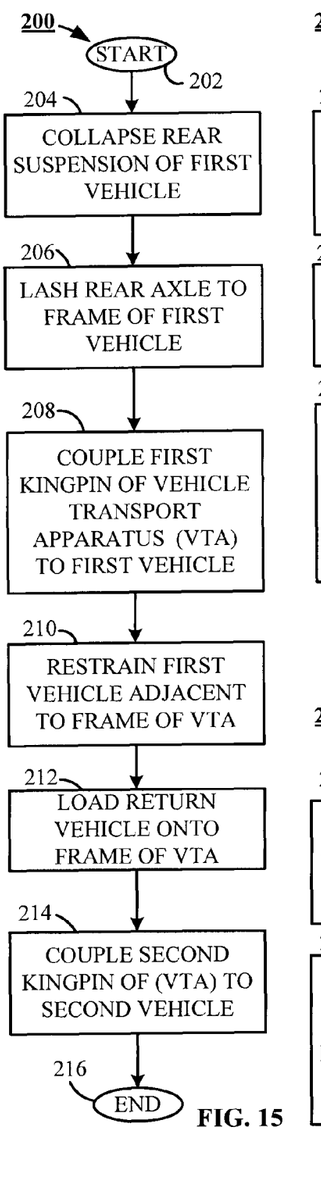
FIG. 15 is flow diagram of a method of using the inventive vehicle transport apparatus of FIG. 1.

Flowchart 200 of FIG. 15 shows method steps of a process of using an inventive vehicle transport apparatus (such as 100). The process commences at start step 202, and continues at process step 204. At process step 204, a rear air suspension of a first vehicle (such as 170) is collapsed, and at process step 206, a rear axle (such as 184) of the first vehicle is lashed to a frame (such as 180) of the first vehicle. At process step 208, a first kingpin of the vehicle transport apparatus is coupled to a fifth wheel (such as 172) of the first vehicle, and at process step 210, the first vehicle is restrained adjacent frame members (such as vehicle support members 136), of the vehicle transport apparatus.

At process step 212, a return vehicle (such as 184) is loaded onto the frame members of the vehicle transport apparatus. With the return vehicle loaded onto the vehicle transport apparatus, a second vehicle (such as 186) is coupled to the vehicle transport apparatus at process step 214, and the process concludes at end process step 216.

Figure 16:
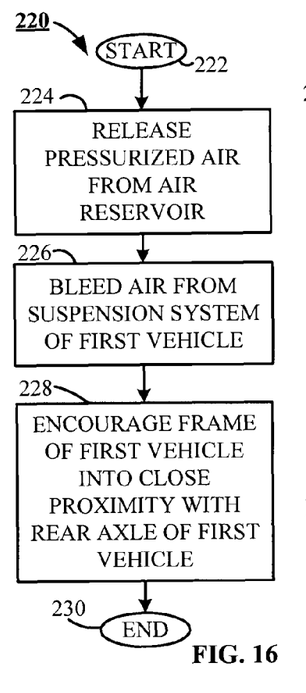
FIG. 16 is flow diagram of a method of collapsing a rear suspension of the inventive vehicle transport apparatus of FIG. 1.

Flowchart 220 of FIG. 16 shows method steps of a process of collapsing a rear suspension of a first vehicle (such as 170). The process commences at start step 222, and continues at process step 224. At process step 224, air pressure is released from an air reservoir (such as 182) of a rear air suspension of the first vehicle. At process step 226, air is bled from each air shock of the rear air suspension system to deplete substantially all air from the rear air suspension system of the first vehicle. At process step 228, a frame (such as 180) of the first vehicle is encouraged into close proximity with a rear axle (such as 184) of the first vehicle, and the process concludes at end process step 230.

Figure 17:
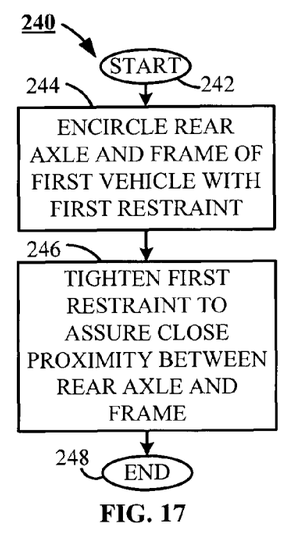
FIG. 17 is flow diagram of a method of lashing an axle of a first vehicle to a frame of the first vehicle.

Flowchart 240 of FIG. 17 shows method steps of a process of lashing a rear axle (such as 184), of a first vehicle (such as 170), to a frame (such as 180) of the first vehicle. The process commences at start step 242, and continues at process step 244. At process step 244, a first restraint (such as a log chain) is used to encircle the axle and the frame of the first vehicle in preparation of securing the axle adjacent the frame. At process step 246, the restraint is tightened to assure the frame of the first vehicle remains in close proximity to the rear axle of the first vehicle, during transport of the first vehicle from a storage yard to a delivery destination. The process concludes at end process step 248.

Figure 18:
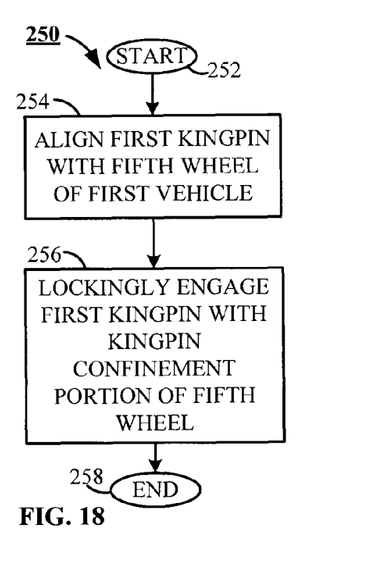
FIG. 18 is flow diagram of a method of the coupling a kingpin of the inventive vehicle transport apparatus of FIG. 1 to a fifth wheel of the first vehicle.

Flowchart 250 of FIG. 18 shows method steps of a process of coupling a first kingpin (such as 108) of a vehicle transport apparatus (such as 100) to a fifth wheel (such as 172) of a first vehicle (such as 170). The process commences at start step 252, and continues at process step 254. At process step 254, the first kingpin is aligned with a kingpin confinement portion (such as 178) of the fifth wheel of the first vehicle, and at process step 256, the first kingpin is lockingly engaged within the kingpin confinement portion of the fifth wheel. The coupling process concludes at end process step 258.

Figure 19:
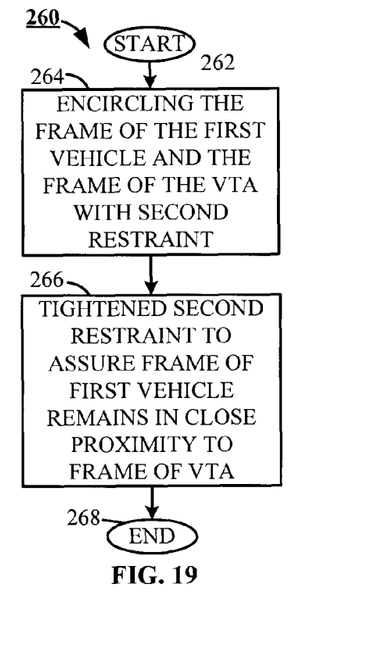
FIG. 19 is flow diagram of a method of restraining the first vehicle to the inventive vehicle transport apparatus of FIG. 1.

Flowchart 260 of FIG. 19 shows method steps of a process of restraining a first vehicle (such as 170), to frame members (such as 136) of a vehicle transport apparatus (such as 100). The process commences at start step 262, and continues at process step 264. At process step 264, encircling a frame (such as 180) of the first vehicle and the frame members of the vehicle transport apparatus are encircled with a second restraint (such as a log chain). At process step 266, the second restraint is tightened to assure the frame of the first vehicle remains in close proximity to the frame members of the vehicle transport apparatus. The restraining process concludes at end process step 268.

Figure 20:
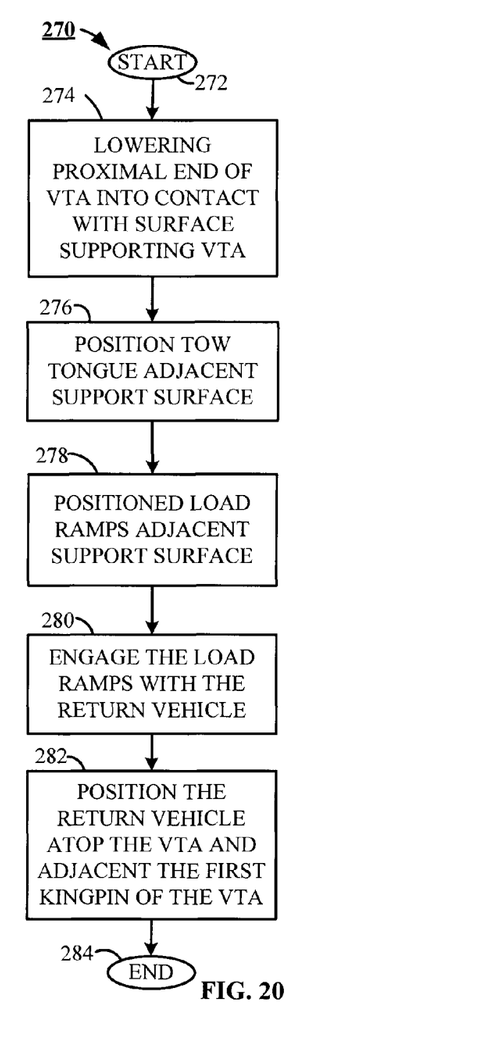
FIG. 20 is flow diagram of a method of loading a return vehicle onto the inventive vehicle transport apparatus of FIG. 1.

Flowchart 270 of FIG. 20 shows method steps of a process of loading a return vehicle (such as pickup truck 185), onto frame members (such as 136), of a vehicle transport apparatus (such as 100). The process commences at start step 272, and continues at process step 274. At process step 274, a proximal end (such as 104), of the vehicle transport apparatus is lowered into contacting engagement with a surface supporting the vehicle transport apparatus. At process step 276, a tow tongue (such as 114) of the vehicle transport apparatus is lowered, or dropped to a position adjacent the surface supporting the vehicle transport apparatus, and at process step 278, load ramps (such as 116), are disposed adjacent the surface supporting the vehicle transport apparatus.

At process step 280, the return vehicle engages the load ramps to position the return vehicle atop the frame members of the vehicle transport apparatus. At process step 282, the return vehicle is positioned adjacent a first kingpin (such as 108) of the vehicle transport apparatus, and the return vehicle loading process concludes at end process step 284.

Figure 21:
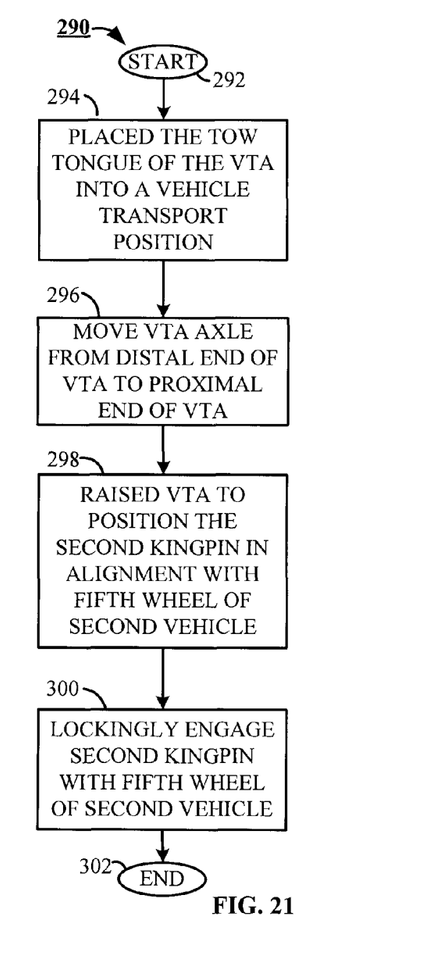
FIG. 21 is flow diagram of a method of coupling a second vehicle to the inventive vehicle transport apparatus of FIG. 1.

Flowchart 290 of FIG. 21 shows method steps of a process of coupling a second vehicle (such as 186) to a second kingpin (such as 102), of a vehicle transport apparatus (such as 100). The process commences at start step 292, and continues at process step 294. At process step 294, placing a tow tongue (such as 114), of the vehicle transport apparatus is placed into a vehicle transport position. At process step 296, an axle (such as 112) of the vehicle transport apparatus is moved from a position adjacent a distal end (such as 110), of the vehicle transport apparatus to a position adjacent a proximal end (such as 104) of the vehicle transport apparatus. At process step 298, frame members (such as 136) of the vehicle transport apparatus are raised, relative to an axle (such as 112) of the vehicle transport apparatus, using a hydraulic lift (such as a first hydraulic cylinder 128), of the axle, to position a second kingpin (such as 102) of the vehicle transport apparatus into alignment with a fifth wheel (such as 188) of a second vehicle (such as 186).

At process step 300, the second kingpin is lockingly engaged within a kingpin confinement portion (such as 178, of the fifth wheel 174, of a first vehicle 170) of the fifth wheel of the second vehicle, and the process of coupling the second vehicle to the second kingpin of the vehicle transport apparatus concludes at end process step 302.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Further, it will be clear that the present invention is well adapted to attain the ends and advantages mentioned as well as those inherent therein. While presently exemplary embodiments have been described for purposes of this disclosure, numerous changes may be made which will readily suggest themselves to those skilled in the art and which are encompassed by the appended claims.

What is claimed is:

1. A method by steps comprising:
    collapsing a rear air suspension of a first vehicle;
    lashing a rear axle of the first vehicle to a frame of the first vehicle;
    coupling a first kingpin of a vehicle transport apparatus to a fifth wheel of the first vehicle;
    restraining the first vehicle adjacent frame members of the vehicle transport apparatus;

loading a return vehicle onto the frame members of the vehicle transport apparatus;

coupling a second kingpin of the vehicle transport apparatus to a fifth wheel of a second vehicle, wherein said vehicle transport apparatus, in addition to said first and second kingpins and said frame members, further includes at least:

a beam supporting said first and second kingpins on respective proximal and distal ends of said beam;

a single and only axle in vertical and horizontal sliding support of said beam, in which said beam is unsupported by said axle during at least one operating mode of said beam;

a guide post attached to said axle;

a vertical slide member attached to said beam and in sliding contact with said guide post; and a vertical position control apparatus interposed between the vertical slide member and said axle, the vertical position control apparatus controlling the vertical position of said beam relative to said axle.

2. The method of claim 1, in which the rear air suspension is collapsed by steps comprising:

releasing air pressure from an air reservoir of the rear air suspension;

bleeding air from each air shock of the rear air suspension system to deplete substantially all air from the rear air suspension system of the first vehicle; and encouraging the frame of the first vehicle into close proximity with the rear axle of the first vehicle.

3. The method of claim 1, in which the rear axle of the first vehicle is lashed to the frame of the first vehicle by steps comprising:

encircling the axle and the frame of the first vehicle with a first restraint; and tightening the first restraint to assure the frame of the first vehicle remains in close proximity to the rear axle of the first vehicle.

4. The method of claim 1, in which the first kingpin of the vehicle transport apparatus is coupled to the fifth wheel of the first vehicle by steps comprising:

aligning the first kingpin with a kingpin confinement portion of the fifth wheel of the first vehicle; and lockingly engaging the first kingpin within the kingpin confinement portion of the fifth wheel.

5. The method of claim 1, in which the first vehicle is restrained adjacent to the frame members of the vehicle transport apparatus by steps comprising:

encircling the frame of the first vehicle and the frame members of the vehicle transport apparatus with a second restraint; and tightening the second restraint to assure the frame of the first vehicle remains in close proximity to the frame members of the vehicle transport apparatus.

6. The method of claim 1, in which the return vehicle is loaded onto the frame members of the vehicle transport apparatus by steps comprising:

lowering a proximal end of the vehicle transport apparatus into contact with a surface supporting the vehicle transport apparatus;

dropping a tow tongue of the vehicle transport apparatus adjacent the surface supporting the vehicle transport apparatus;

disposing a load ramp of the vehicle transport apparatus into contact with the surface supporting the vehicle transport apparatus;

engaging the load ramp to position the return vehicle atop the frame members of the vehicle transport apparatus; and positioning the return vehicle adjacent the first kingpin of the vehicle transport apparatus.

7. The method of claim 1, in which the second vehicle is coupled to the second kingpin of the vehicle transport apparatus by steps comprising:

placing a tow tongue of the vehicle transport apparatus into a vehicle transport position;

moving an axle of the vehicle transport apparatus from adjacent a distal end of the vehicle transport apparatus to a position adjacent a proximal end of the vehicle transport apparatus;

raising the frame members of the vehicle transport apparatus using a hydraulic lift of the axle to position the second kingpin of the vehicle transport apparatus into alignment with the fifth wheel of the second vehicle; and lockingly engaging the second kingpin within the kingpin confinement portion of the fifth wheel of the second vehicle.

8. The method of claim 7, in which the return vehicle is loaded onto the frame members of the vehicle transport apparatus by steps comprising:

lowering a proximal end of the vehicle transport apparatus into contact with a surface supporting the vehicle transport apparatus;

dropping a tow tongue of the vehicle transport apparatus adjacent the surface supporting the vehicle transport apparatus;

disposing a load ramp of the vehicle transport apparatus into contact with the surface supporting the vehicle transport apparatus;

engaging the load ramp to position the return vehicle atop the frame members of the vehicle transport apparatus; and positioning the return vehicle adjacent the first kingpin of the vehicle transport apparatus.

* * * * *